UNITED STATES PATENT OFFICE.

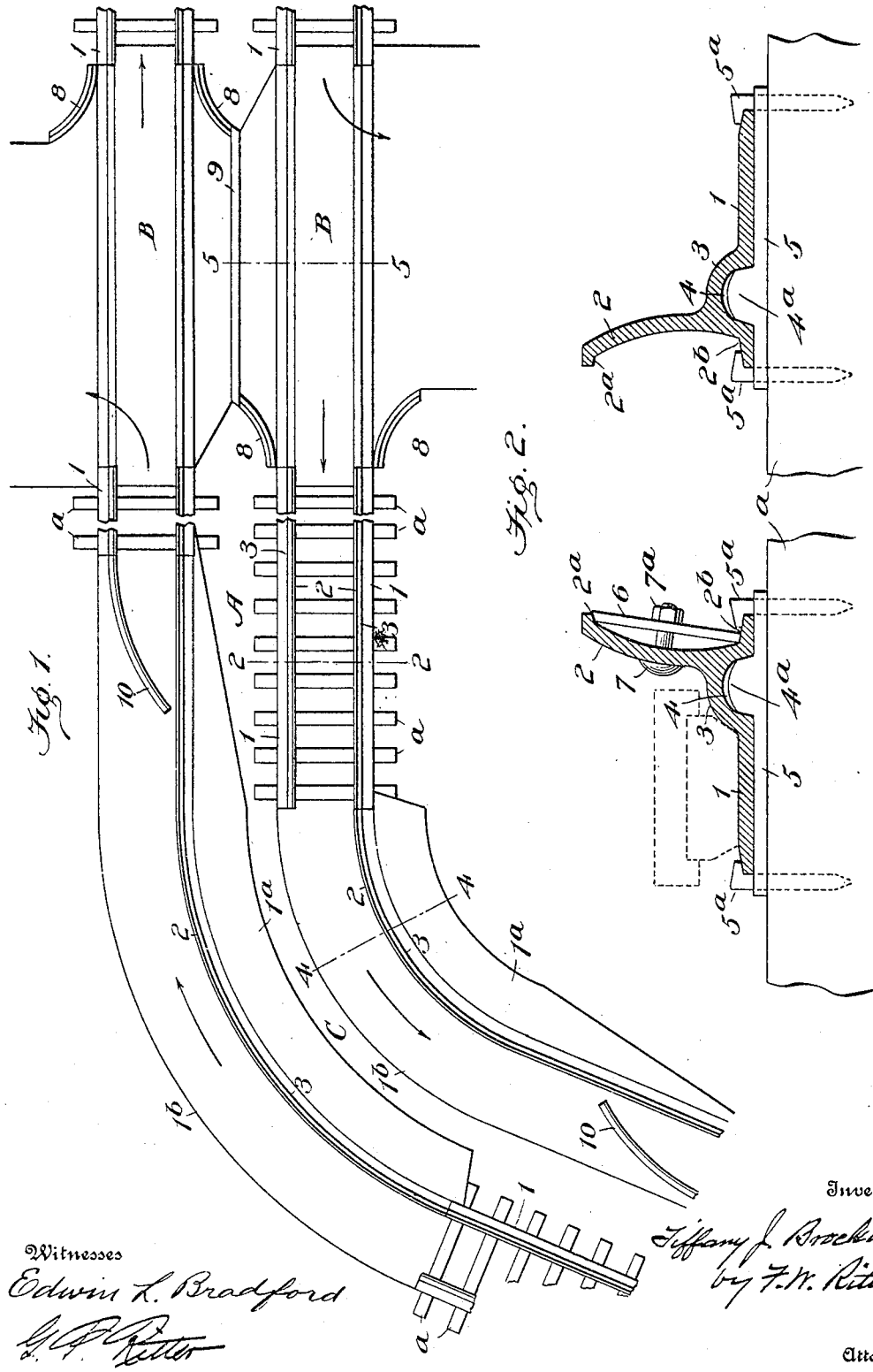

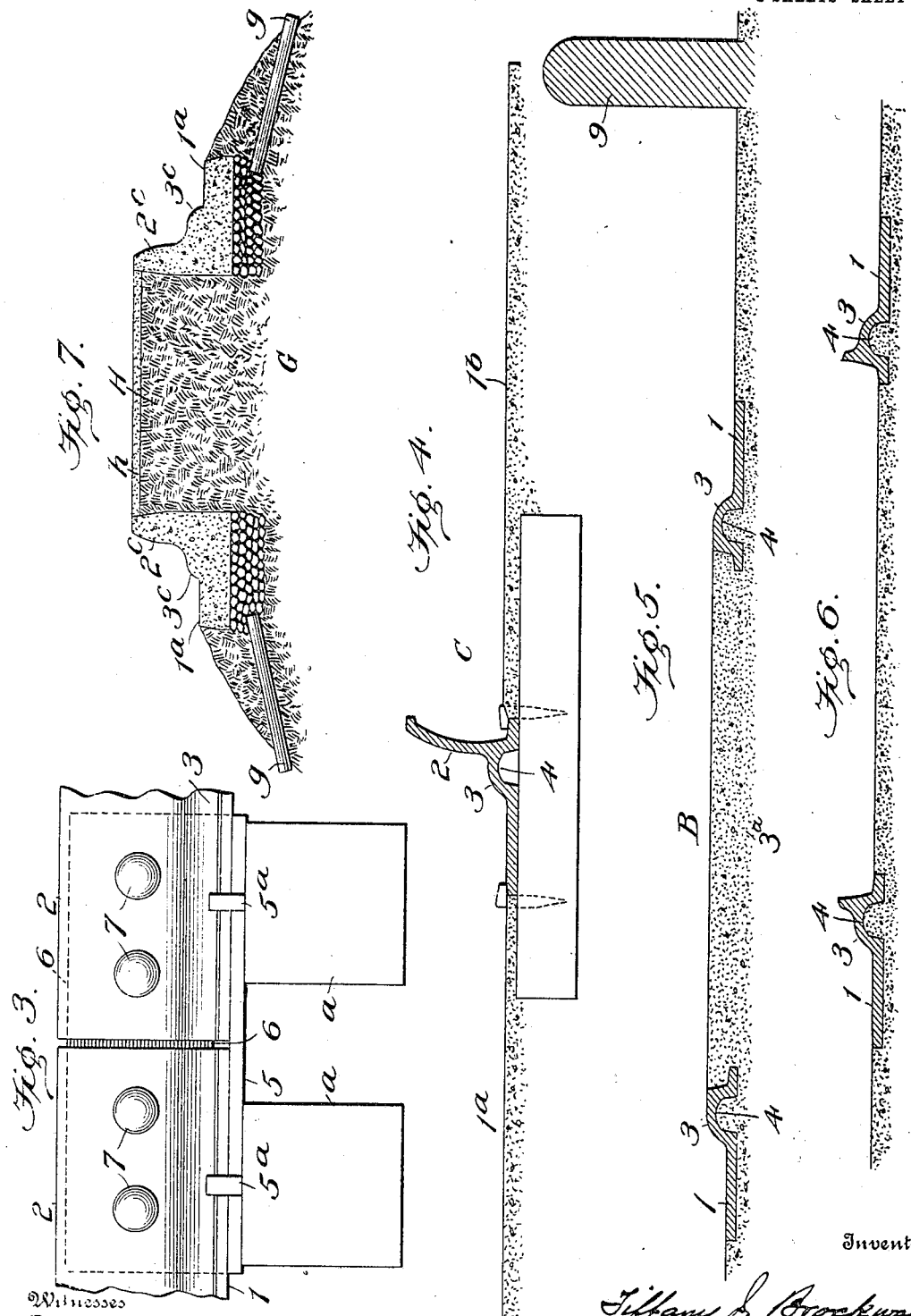

TIFFANY J. BROCKWAY, OF ALINE, OKLAHOMA TERRITORY.

RAIL SYSTEM FOR VEHICLES.

No. 831,702.	Specification of Letters Patent.	Patented Sept. 25, 1906.

Application filed March 31, 1906. Serial No. 309,086.

*To all whom it may concern:*

Be it known that I, TIFFANY J. BROCKWAY, a citizen of the United States, residing at Aline, in the county of Woods and Territory of Oklahoma, have invented certain new and useful Improvements in Rail Systems for Vehicles; and I do hereby declare the following to be a full, clear, and exact description of the invention, such as will enable others skilled in the art to which it appertains to make and use the same.

My invention relates to the construction of that class of track or tramway which while affording a suitable road for all classes of vehicles is by reason of certain characteristics of the rails and the relative arrangement thereof especially adapted for motor-vehicles, and has for its several objects the production of a track which shall be of economical first cost and cheap maintenance, productive of the minimum wear on vehicle-tires and of the maximum of safety under ordinary conditions and speeds, and which will in the case of motor-vehicles minimize the attention necessary to the guidance of the vehicle, as well as obviate in a great measure the use of the guide or steering wheels thereof.

To this end my invention, generally stated, embraces, first, a construction of rail wherein are combined with the rail-tread an inner safety-flange and an intermediate guide-flange of less height, whereby the tires or tires and fellies of a vehicle are preserved from wear and the track may be readily relieved of dust, dirt, snow, ice, or other obstructions; second, such an arrangement on curves of a single inner rail having an expanded or widened tread as will direct the front wheels of the vehicle without restricting the range of lateral movement of the rear wheels, or, in other words, a construction which will provide for the non-trackage of the wheels on curves, and, third, the provision at platforms, turnouts, crossings, and curves of converging guide-flanges to insure the reëntrance of the vehicle-wheels at points where the guard-flanges of one or both track-rails have been removed.

There are other minor features of invention embracing the manner of laying the track and of joining the rail-sections under ordinary conditions and also on bridges, sharp curves, or other places requiring a larger factor of safety, all of which will hereinafter more fully appear.

In the drawings accompanying this specification and illustrating the preferred application of the invention, Figure 1 is a plan view of a track system embodying my invention, showing a platform for turnouts and the construction on a curve, portions of the track between the platform and curve being broken away. Fig. 2 is an enlarged cross-section of the track-rails on the line 2 2, Fig. 1, showing the joint-chair and also a fish-plate, which may be used in connecting the rails on bridges and sharp curves or wherever great safety is necessary. Fig. 3 is a side elevation of the rail-joint shown in Fig. 2. Fig. 4 is an enlarged cross-section of the track-rails on the line 4 4, Fig. 1, showing the provision for a widened tread at curves where a single rail is employed and where non-trackage of the vehicle-wheels occurs. Fig. 5 is an enlarged transverse section of the platform or turnout on the line 5 5, Fig. 1. Fig. 6 is a transverse section of the track at common road-crossings, where it is not intended that a motor-vehicle shall turn out or turn in; and Fig. 7 is a transverse section of a section of track wherein the track-rails are formed of a cement composition.

Like symbols refer to like parts wherever they occur.

I will now proceed to particularly describe the embodiment of my system illustrated in the drawings, so that others skilled in the art may apply the invention.

In the drawings is shown a double-track system in which at stations provision (not shown) may be made in the usual or any known way for underneath or overhead crossings and with which, if desired, a block-signaling system may be instituted, which latter would be desirable, if not necessary, where the invention is applied to a single-track road.

The character of the rail, which will first be described, is illustrated in cross-section in Fig. 2 of the drawings, wherein 1 indicates the tread of the rail, which is of substantially flat or plate form, bounded on its inner margin by a safety-flange 2 of sufficient height to prevent the derailing of the vehicle from side surging, said members 1 and 2 constituting practically a form of angle-iron, one flange of which is somewhat curved for purposes which will hereinafter appear. Intermediate of the tread 1 and safety-flange 2, and forming, substantially, a fillet for the angle-bar, is a low ridge or swell 3, preferably of convex or curved form, constituting a guide-flange, the height of which should preferably not exceed the thickness of the tires of such vehicles as are to be employed. By so constructing the guide-flange the rims or fellies of the wheels stand above said flange, and any scraping or grinding of the tire and felly of a moving vehicle is avoided.

For the purpose of connecting and alining the rails at the joints the under side of the rail is preferably channeled or grooved in line with and below the guide-flange 3, as indicated at 4, for the reception of a corresponding rib $4^a$ on the upper surface of a chair or tie-plate 5, and in order to provide seats for a fish-plate 6 the curved safety-flange 2 of the rail is preferably formed with seats or shoulders $2^a$ $2^b$ on its face opposite the tread of the rail.

All tangent or easy curve sections A of the track will be laid with rails of the cross-section above noted, and when said rails are of metal, as will most commonly occur, they may be spiked to the ties $a$ $a$ in the usual manner of track-laying, the ends of the rails being connected by and supported on tie-plates or chairs 5 and spiked to the ties, as at $5^a$. This simple connection will suffice for all ordinary conditions; but where an extra factor of safety is demanded, as on bridges or sharp curves, the adjacent ends of the ties are connected by fish-plates 6, the top and bottom edges of which rest upon the shoulders or seats $2^a$ $2^b$ of the safety-flanges and are connected to said flanges by suitable bolts and nuts 7 $7^a$, provision being made in the usual manner for the expansion and contraction of the rails at the joint. The spring of the plate and the curve and spring of the safety-flange 2 will insure the retention of the nuts $7^a$ and the integrity of the connection under all circumstances short of fracture of the parts.

At stations or at turnouts B the safety-flange 2 of the rail will be omitted, but the intermediate guide-flange 3, which can be readily mounted by the vehicle-wheels, will be continued, and at the opposite side of the crossing converging guide-flanges 8 will be located exterior to the rails and in such relation thereto as to direct the front wheels back upon the rails and insure the tracking of the rear wheels, whereby all danger of injuring the tires and rims of the wheels will be obviated.

In the case of double-track systems at stations or turnouts where crossing the tracks is accompanied by more of less danger and it is desirable to prohibit the same a guard-flange 9 of excessive height may be extended from one to another of the guide-flanges 8 8, or in lieu thereof a partition-fence may be erected. In such cases the crossing will be made either above or below the track-level, as hereinbefore noted. It will also be found advantageous at turnouts to fill the space $3^a$ intermediate of the guide-flanges 3 with a concrete composition.

In case of curves, as at C, and especially if the curves be on a short radius, the outer rail is omitted, or at least the guide and guard flange thereof are omitted, and the tread of the inner or retained rail is widened out or extended, as at $1^a$, by means of concrete composition to such an extent as will accommodate the range or side movement of the rear wheel of that side, and in lieu of the outer rail an equivalent wide tread of sheet-steel or of concrete composition may be provided, as at $1^b$, for the outside rear wheel. A guide-flange 10, which converges from the outer toward the inner rail, will be placed at the entrant end of the outer rail to insure the proper reëngagement of the outer front wheel with the outer rail and the trackage of the outer rear wheel without danger of injury to the rims and tires thereof.

In some instances it may be found desirable to form the rails of cement composition, especially the widened-out tread, and indeed cement-composition rails are admirably adapted to all straight and curved sections of track, except on bridges and at road-crossings, where metal will be found preferable. In such cases the rails may be molded in the usual manner and laid upon grouting or sand beds G, drained, if desired, by suitable tilings $g$, the space between the rails being filled in with earth H and capped by a light cement covering $h$, which will turn the water from the tracks, while the filling H will reinforce the guard-flange $2^c$ of the rail. The general form of the rail—viz., the tread $1^a$ and low guide-flange $3^c$—will correspond in outline with the metal rail shown in the principal figures of the drawings.

Having thus described my invention, what I claim, and desire to secure by Letters Patent, is—

1. A rail system for vehicles, comprising parallel rails each of said rails having an outer tread, an inner safety-flange, and an intermediate guide-flange.

2. A rail system for vehicles, comprising parallel rails each of said rails having an outer tread, an inner safety-flange, and an intermediate guide-flange of less height than the guard-flange.

3. A rail system for vehicles, comprising parallel rails each of which has an outer tread, an inner safety-flange, and an intermediate convex guide-flange constituting a fillet between the tread and guard-flange.

4. A rail system for vehicles, comprising a series of parallel rails each of which has an outer tread, an inner safety-flange and an intermediate guide-flange, the outer rails of the series being omitted on curves and the treads of the inner series widened to accommodate the rear wheels of a vehicle.

5. A rail system for vehicles, comprising a series of parallel rails each of which has an outer tread, an inner safety-flange, and an intermediate guide-flange, the safety-flange of the outer rails being omitted at points such as stations, or turnouts.

6. A rail system for vehicles, comprising a series of parallel rails each of which has an outer tread, an inner safety-flange, and an intermediate guide-flange, the safety-flanges of the rails being reduced to stub-flanges.

7. A rail system for vehicles, comprised of parallel rails each of which has an outer tread, an inner safety-flange and an intermediate guide-flange, the safety-flanges of the rails being omitted at certain points, and converging guide-flanges arranged with relation to the entrant-rails at the points where the safety-flanges are omitted.

8. A rail system for vehicles, comprising a series of parallel rails each of which has an outer tread, an inner safety-flange, and an intermediate guide-flange, the outer rails of the series being omitted on curves, and converging guide-flanges arranged at the entrant end of the rail to insure the reëngagement of the front wheel of a vehicle and the tracking of the rear wheel.

9. The combination in a rail system for vehicles, of a plurality of rails each having an outer tread, an inner safety-flange and an intermediate guide-flange, said guide-flange being grooved on its under surface, of a rail-chair having on its upper surface a rib which enters the grooved under surface of the guide-flange of the rail.

10. A rail for auto-tracks, said rail having the general cross-section of an angle-iron with a fillet at the intersection of its flanges, said fillet constituting a guide-flange for a vehicle-wheel.

11. A rail system for vehicles, comprising a series of parallel rails each of which has an outer tread, an inner safety-flange, and an intermediate guide-flange, the safety-flanges of the rails being omitted at turnouts.

12. A rail system for vehicles, comprising a series of parallel rails each of which has an outer tread, an inner safety-flange, and an intermediate guide-flange, the safety-flanges of the rails being omitted at turnouts, and the space intermediate the guide-flanges being filled with concrete composition.

In testimony whereof I affix my signature in presence of two subscribing witnesses.

TIFFANY J. BROCKWAY.

Witnesses:
G. M. SNAVELY,
A. J. TITUS.